United States Patent Office 2,710,875
Patented June 14, 1955

2,710,875

METHOD OF PREPARING HYDROCARBON SUBSTITUTED CHLOROSILANES

William H. Daudt, Midland, Mich., assignor to Dow Corning Corporation, Midland, Mich., a corporation of Michigan No Drawing. Application October 24, 1951, Serial No. 252,986

15 Claims. (Cl. 260—448.2)

This invention relates to a new and improved method of preparing hydrocarbon substituted chlorosilanes.

This application is a continuation-in-part of the applicant's copending application Serial No. 159,877, filed May 3, 1950, now abandoned, which is in turn a continuation-in-part of his application Serial No. 119,386, filed October 3, 1949, now abandoned.

The most direct method of synthesizing hydrocarbon derivatives of chlorosilanes such as, for example, methyltrichlorosilane or the phenylmethyldichlorosilane would be that of reacting a hydrocarbon with silicon tetrachloride or methyltrichlorosilane. This method should also be the most economical way in which to produce chlorosilanes. In spite of these advantages no commercial method for so producing hydrocarbon substituted chlorosilanes has heretofore been devised. Past attempts to carry out this direct synthesis have given negative results or at best exceedingly poor yields of the desired chlorosilane.

It is an object of this invention to provide a method for the direct synthesis of hydrocarbon substituted chlorosilanes from hydrocarbons.

In accordance with this invention a hydrocarbon selected from the group consisting of aliphatic hydrocarbons, benzene, and biphenyl, is reacted with silicon and a chlorosilane of the type $R_nSiCl_{4-n}$ where $n$ has a value from 0 to 1 and R is alkyl or phenyl, at a temperature of from 200° C. to 600° C. and at a pressure of at least 75 p. s. i.

In this application the term "xenyl" designates the radical $C_6H_5C_6H_4$—. Thus the reaction of biphenyl with silicon tetrachloride in accordance herewith produces xenyltrichlorosilane.

Under the above conditions, reaction between the hydrocarbon and the chlorosilane begins at once with the formation of the corresponding hydrocarbon derivatives of the chlorosilane and HCl. The latter reacts with silicon to form silicon tetrachloride and hydrogen. Thus the silicon functions as a hydrogen chloride acceptor and thereby prevents cleavage of the hydrocarbon groups from hydrocarbon substituted chlorosilanes.

Since the reaction between the silicon and HCl is a surface phenomenon, improved yields of the hydrocarbon substituted chlorosilane are obtained when the silicon is in a finely divided state, for example, 20 mesh per inch or less and when the silicon is employed in excess of the theoretical amount, for example, upwards of 2 mols of silicon per mol of HCl produced.

The silicon employed in this invention may be pure or it may contain minor amounts of impurities such as carbon, iron, aluminum, calcium and other metals which are normally present in commercial silicon or its alloys.

The reaction should be carried out at temperatures between 200° C. and 600° C. Below this range reaction between the silicon and HCl does not take place at a rate sufficient that the hydrogen chloride is effectively removed from the reaction mixture. Hence the yield of hydrocarbon substituted chlorosilane is poor. The preferred temperature range is from 275° C. to 500° C.

In order to obtain significant yields of the desired product the reaction should be carried out at a pressure of at least 75 p. s. i. The upper pressure limit is not critical but normally pressures above 2500 p. s. i. are not encountered.

The hydrocarbons which are operative in this invention are benzene, biphenyl or any aliphatic hydrocarbon. The aliphatic hydrocarbons which are operative are saturated hydrocarbons such as methane, ethane, heptane, octadecane or higher or unsaturated aliphatic hydrocarbons such as ethylene, isobutylene, acetylene, butadiene, octadecene, together with higher members of the unsaturated aliphatic hydrocarbon series. The hydrocarbon employed may be a mixture of any or all of the above type hydrocarbons.

The chlorosilanes which are employed in the present process are any chlorosilanes of the general formula $R_nSiCl_{4-n}$ in which R is alkyl or phenyl and in which $n$ has a value from 0 to 1, or mixtures thereof. Thus silanes which are operative in this invention are, for example, silicon tetrachloride, phenyltrichlorosilane, ethyltrichlorosilane and octadecyltrichlorosilane.

The products obtained by the method of this invention vary somewhat depending upon the starting materials. For example, when the reactants are benzene, biphenyl or methane with, say, silicon tetrachloride, the products are principally phenyltrichlorosilane, xenyltrichlorosilane and methyltrichlorosilane, respectively. When higher aliphatic hydrocarbons or higher alkylchlorosilanes are employed in the reaction mixture, chlorosilanes are produced which include both higher alkyl chlorosilanes and lower alkyl chlorosilanes. The appearance of the lower alkylchlorosilane is probably due to some cracking of the higher aliphatic hydrocarbons. For example, the reaction of hexane with silicon tetrachloride will produce a mixture of hexylchlorosilanes together with methylchlorosilanes and intermediate alkylchlorosilanes.

If desired, catalysts such as aluminum chloride and boron trichloride may be employed to increase the rate of reaction. Such catalysts are preferred when temperatures in the lower part of the defined range are used. If employed, the catalyst is preferably present in amount from 0.1 mol per cent to 15 mol per cent based on the total hydrocarbon and chlorosilane.

The present method produces hydrocarbon substituted chlorosilanes in yields of 15 to 50 per cent of theoretical. The chief by-products of this reaction is silicon tetrachloride which may be employed to prepare more of the above chlorosilanes. Hence, loss due to undesirable by-products is reduced to a minimum.

The hydrocarbon substituted chlorosilanes produced by the method of this invention are well known commercial products and have found wide utility in many industrial applications either per se or as intermediates in the preparation of siloxanes.

The following examples are illustrative only and should not be construed as limiting the invention which has been properly delineated in the appended claims.

Example 1

3 gram mols of silicon tetrachloride, 3 gram mols of benzene, 0.056 gram mol of aluminum chloride and 40 gram mols of powdered silicon containing about 1 per cent by weight each of iron and aluminum and having a particle size of 48 mesh per inch and less, were heated in an iron bomb at 350° C. at a pressure of 1135 p. s. i. for 115 hours. The liquid contents of the bomb were distilled and there was obtained 271 grams of silicon tetrachloride, 125 grams benzene and 192 grams of phenyltrichlorosilane boiling at 97° C. to 102° C. at 30 mm.

The yield of phenyltrichlorosilane was 31 per cent of theoretical.

Example 2

A 2.4 liter iron bomb was loaded with ½ gram mol of $SiCl_4$, ½ gram mol of benzene, 15.3 gram mols powdered silicon having a particle size of 48 mesh per inch and less, and 0.024 gram mol of aluminum chloride. The silicon was a commercial grade which contained about 1 per cent by weight each of iron and aluminum. The bomb was sealed and heated at 350° C. for 118 hours at a pressure of from 130 p. s. i. to 160 p. s. i. The bomb was then cooled and 104.2 grams of liquid product was removed. Upon fractionation of the product 18.6 grams of phenyltrichlorosilane was obtained. This is a 17.6 per cent yield.

Example 3

3 gram mols of $SiCl_4$, 3 gram mols of benzene and 45.1 gram mols of 99.9 per cent pure powdered silicon having a particle size of 150 to 325 mesh per inch were heated in an iron bomb at 450° C. for 18 hours at a pressure of 1900 p. s. i. The bomb was cooled and upon distillation of the reaction product 233 grams of phenyltrichlorosilane representing a 37 per cent yield was obtained.

Example 4

A 2.4 liter iron bomb was charged with 45 gram mols of powdered silicon having a particle size of 48 mesh per inch and less, 3 gram mols of silicon tetrachloride, 3 gram mols of benzene and 0.056 gram mol of aluminum chloride. The silicon was a commercial grade which contained 1 per cent by weight each of iron and aluminum. The bomb was rotated and heated at 460° C. for 5 hours at a pressure of 1705 p. s. i. The bomb was then cooled and upon distillation unreacted benzene and silicon tetrachloride were first removed and then 157 grams of phenyltrichlorosilane boiling at 94° C. to 95° C. at 28 mm. was obtained. This represents a 25 per cent yield of the desired material.

Example 5

A 2.4 liter iron bomb was charged with 45 gram mols of 99.9 per cent pure silicon powder having a particle size of 150 to 325 mesh per inch, 3 gram mols of benzene, 3 gram mols of $SiCl_4$ and 0.065 gram mol of $BCl_3$. The bomb was then heated for 117 hours at 350° C. at a pressure of 1400 p. s. i. Upon distillation of the liquid reaction product 95 grams of phenyltrichlorosilane was obtained. This represents a 15 per cent yield.

Example 6

A mixture of 5 mols of benzene, 1.25 mols of methyltrichlorosilane and 42 mols of 99.9 per cent pure silicon powder was heated in a bomb at 450° C. at a maximum pressure of 1900 p. s. i. for 18 hours. The reaction product was distilled and there was obtained .66 mol of unreacted methyltrichlorosilane and a mixture of phenylmethyldichlorosilane and phenyltrichlorosilane boiling point 71° C. to 82° C. at 11 mm., amounting to a 21 per cent yield based on a theoretical yield of 1.67 mols of phenylchlorosilanes. A small amount of diphenyldichlorosilane was also obtained.

A similar mixture of products is obtained when methane and phenyltrichlorosilane are employed in the above reaction instead of methyltrichlorosilane and benzene.

Example 7

A mixture of 5 mols of benzene, 1.25 mols of $SiCl_4$ and 44 mols of 99.9 per cent pure silicon powder was heated in a bomb 18 hours at 450° C. at a maximum pressure of 2050 p. s. i. Upon distillation of the product there was obtained .39 mol of unreacted $SiCl_4$ and 2.39 mols of benzene together with .81 mol of phenyltrichlorosilane and .07 mol of diphenyldichlorosilane.

Example 8

A mixture of 47 mols of silicon powder, 2.2 mols of biphenyl and 2.2 mols of $SiCl_4$ was heated 18 hours at 450° C. at a pressure of 850 to 1050 p. s. i. The reaction product was distilled and there was recovered .92 mol of $SiCl_4$ and .75 mol of biphenyl together with .21 mol of phenyltrichlorosilane and .4 mol of a mixture of para-xenyltrichlorosilane and meta-xenyltrichlorosilane.

Example 9

Silicon in an amount of 1290 grams, together with 340 grams of silicon tetrachloride, was placed in a 2.4 liter autoclave. Methane was introduced in the autoclave under pressure in amount sufficient to raise the pressure at room temperature to 590 lbs. p. s. i. The autoclave was then heated for sixty-nine hours at 450° C. The pressure rose to a maximum of 2230 lbs. p. s. i. The autoclave sprung a leak during the night. The autoclave was cooled and discharged. Upon discharge of the autoclave 169 grams of liquid product was obtained. This was distilled to give 62 grams of methyltrichlorosilane and 2 grams of dimethydichlorosilane, the remainder being silicon tetrachloride and residue. The total methylchlorosilanes obtained was 38 per cent by weight of the distilled product.

Example 10

The autoclave described in Example 1 was loaded with silicon and silicon tetrachloride in the amounts stated in Example 1. Diisobutylene was added to the autoclave in an amount of 200 grams. The autoclave was then closed and heated to a temperature of 425° C. for forty-eight hours. The pressure rose to a maximum of 1950 lbs. p. s. i. The autoclave was then cooled and the liquid product discharged. 113 grams of the product obtained were distilled, whereby the following cuts were obtained in the amounts stated:

| | Grams |
|---|---|
| Mixed $CH_3SiCl_3$ and $(CH_3)_2SiCl_2$ | 15.2 |
| $C_2H_5SiCl_3$ | 10.1 |
| $C_3H_7SiCl_3$ | 14.4 |
| $C_4H_9SiCl_3$ | 4.8 |

Example 11

The autoclave described in Example 1 was loaded with 340 grams of silicon tetrachloride, 200.4 grams of normal heptane and 1290 grams of silicon. The autoclave was closed and heated for six and one-half hours to between 400 and 580° C. The autoclave was then cooled and discharged. The liquid product obtained was distilled. Of the silanes identified, 54 per cent was silicon tetrachloride, 32 per cent was $CH_3SiCl_3$ and 12 per cent was $C_2H_5SiCl_3$.

Example 12

The autoclave of Example 1 was again charged with the materials described in Example 3 in the amounts there stated. The autoclave was closed and heated to between 410° and 430° C. for forty-eight hours. The pressure rose to a maximum of 2240 lbs. p. s. i. It was cooled and the liquid product discharged and distilled. Of the silanes obtained, the following were identified in the amounts indicated:

| | Per cent |
|---|---|
| $SiCl_4$ | 33 |
| $CH_3SiCl_3$ | 20 |
| $C_2H_5SiCl_3$ | 12 |
| $C_3H_7SiCl_3$ | 28 |
| $C_4H_9SiCl_3$ | 7 |

Example 13

The autoclave described in Example 1 was loaded with 300 grams of methyltrichlorosilane, 172.4 grams of normal heptane and 1290 grams of silicon. The autoclave was closed and heated to 425° C. for forty-eight hours. The pressure rose to a maximum of 2200 lbs. p. s. i. At the end of forty-eight hours the autoclave was cooled and the liquid product discharged and distilled. 251 grams of this liquid product yielded upon distillation 15 grams of silicon tetrachloride, 0.6 gram of $CH_3HSiCl_2$, 82 grams of $CH_3SiCl_3$, 8.3 grams of $(CH_3)_2SiCl_2$, 0.7 gram of $(CH_3)_3SiCl$, 25 grams of $C_2H_5SiCl_3$, 3.7 grams of $CH_3C_2H_5SiCl_2$, and 35.5 grams of propyl-substituted chlorosilanes.

*Example 14*

1300 grams of silicon powder, 156.2 grams of benzene, 170 grams of $SiCl_4$ was placed in a 2.4 liter bomb and then methane was charged into the bomb at room temperature until the pressure reached 550 p. s. i. The mixture was heated 60 hounrs at 450° C. The maximum pressure obtained was 2125 p. s. i. The bomb was cooled and 324 grams of liquid product was obtained. Infrared analysis of this product indicated that it contained on a weight per cent basis, 13 per cent methyltrichlorosilane, 32 per cen phenyltrichlorosilane and about 5 per cent phenylmethyldichlorosilane.

*Example 15*

2 gram mols of $SiCl_4$, 2.4 gram mols of methane, 44 gram atoms of powdered silicon and 10 grams of $AlCl_3$ were heated together in an autoclave for 60 hours at 425° C. The maximum pressure was 2200 p. s. i. 337 grams of product was obtained which upon distillation gave 22 per cent by weight methyltrichlorosilane.

What is claimed is:

1. A method of preparing hydrocarbon substituted chlorosilanes which comprises reacting a hydrocarbon selected from the group consisting of aliphatic hydrocarbons, benzene and biphenyl with silicon and chlorosilane of the formula $R_nSiCl_{4-n}$ where $n$ has a value from 0 to 1, and R is selected from the group consisting of alkyl and phenyl radicals, at a temperature from 200° C. to 600° C. and at a pressure of at least 75 p. s. i.

2. The method in accordance with claim 1 in which the silicon has a particle size of less than 20 mesh per inch.

3. The method of preparing phenyltrichlorosilane which comprises reacting benzene, silicon tetrachloride and silicon at a temperature of from 275° C. to 500° C. and at a pressure of at least 75 p. s. i.

4. The method in accordance with claim 3 in which the silicon has a particle size of less than 20 mesh per inch.

5. The method of preparing xenyltrichlorosilane which comprises reacting biphenyl, silicon tetrachloride and silicon at a temperature of from 275° C. to 500° C. and at a pressure of at least 75 p. s. i.

6. The method in accordance with claim 5 in which the silicon has a particle size of less than 20 mesh per inch.

7. A method of preparing aliphatic chlorosilanes which comprises reacting an aliphatic hydrocarbon with silicon tetrachloride and silicon at a temperature of from 200° C. to 600° C. and at a pressure of at least 75 p. s. i.

8. The method in accordance with claim 8 in which the silicon has a particle size of at least 20 mesh per inch.

9. A method of preparing methylchlorosilanes which comprises reacting methane, silicon tetrachloride and silicon at a temperature of from 275° C. to 500° C. and at a pressure of at least 75 p. s. i.

10. The method in accordance with claim 9 in which the silicon has a particle size of less than 20 mesh per inch.

11. The method of preparing a hydrocarbon substituted chlorosilane which comprises reacting a hydrocarbon selected from the group consisting of aliphatic hydrocarbons, benzene and biphenyl, with methyltrichlorosilane and silicon at a temperature of from 200° C. to 600° C. and at a pressure of at least 75 p. s. i.

12. A method in accordance with claim 11 in which the silicon has a particle size of less than 20 mesh per inch.

13. A method of preparing hydrocarbon substituted chlorosilanes which comprises reacting a hydrocarbon selected from the group consisting of aliphatic hydrocarbons, benzene and biphenyl with a chlorosilane of the formula $R_nSiCl_{4-n}$ where $n$ has a value from 0 to 1 and R is selected from the group consisting of alkyl and phenyl radicals, and silicon, in contact with a catalyst selected from the group consisting of aluminum chloride and boron trichloride in amount from 0.1 to 15 mol per cent based upon the total mols of the hydrocarbon and chlorosilane, at a temperature of between 200° C. and 600° C. and at a pressure of at least 75 p. s. i.

14. The method in accordance with claim 13 wherein the silicon has a particle size of less than 20 mesh per inch.

15. A method of preparing hydrocarbon substituted chlorosilanes which comprises reacting an aromatic hydrocarbon selected from the group consisting of benzene and biphenyl with a chlorosilane of the formula $R_nSiCl_{4-n}$ where $n$ has a value from 0 to 1 and R is selected from the group consisting of alkyl and phenyl radicals, and silicon, in the presence of an aluminum chloride catalyst, at a temperature of 300° C. to 500° C. under superatmospheric pressure.

References Cited in the file of this patent

UNITED STATES PATENTS

| | | |
|---|---|---|
| 2,405,019 | Dablin | July 30, 1946 |
| 2,576,448 | Daudt | Nov. 27, 1951 |

OTHER REFERENCES

Mellor, "Treatise, Inorganic and Theoretical Chemistry," vol. 6, pages 960–961, Longmans, Green and Co., N. Y. (1925).

Rochow, "Jour. Amer. Chem. Soc.," vol 67 (1945), pages 1772–1774.

Rooney et al., Investigation of German Plastics Plants, part 2, SHAEF C. I. O. S. item Nos. 9, 22, file XXXIII–23, pages 136–7–PB25, 642. Received by Library of Congress, August 1946.